(12) United States Patent
Hanson et al.

(10) Patent No.: US 7,150,560 B2
(45) Date of Patent: Dec. 19, 2006

(54) DEVICE AND METHOD FOR DETERMINING TOTAL TEMPERATURE FOR AIRCRAFT

(75) Inventors: Nicolas Hanson, Vendome (FR); Lionel Collot, Vendome (FR)

(73) Assignee: Thales, Neuilly sur Seine (FR)

( * ) Notice: Subject to any disclaimer, the term of this patent is extended or adjusted under 35 U.S.C. 154(b) by 69 days.

(21) Appl. No.: 10/934,782

(22) Filed: Sep. 7, 2004

(65) Prior Publication Data

US 2005/0232332 A1    Oct. 20, 2005

(30) Foreign Application Priority Data

Sep. 16, 2003  (FR)  .................................. 03 10869

(51) Int. Cl.
*G01K 13/02*    (2006.01)
*G01K 1/16*    (2006.01)

(52) U.S. Cl. .................... 374/141; 374/135; 73/170.02

(58) Field of Classification Search ................ 374/141, 374/208, 172, 135, 140, 24, 109, 22; 73/170.02, 73/561, 181, 202.25, 204.11
See application file for complete search history.

(56) References Cited

U.S. PATENT DOCUMENTS

| | | | | | |
|---|---|---|---|---|---|
| 2,755,999 | A | * | 7/1956 | Vickers | 236/69 |
| 2,959,958 | A | * | 11/1960 | Savet | 73/181 |
| 3,016,745 | A | * | 1/1962 | Simon | 136/231 |
| 3,170,328 | A | * | 2/1965 | Werner et al. | 338/28 |
| 3,216,258 | A | * | 11/1965 | Spencer et al. | 374/138 |
| 3,512,414 | A | * | 5/1970 | Rees | 374/148 |
| 3,545,068 | A | * | 12/1970 | Bowles | 29/421.1 |
| 3,735,635 | A | * | 5/1973 | Hazen | 73/181 |
| 3,769,792 | A | * | 11/1973 | Grey | 60/39.281 |
| 4,110,605 | A | * | 8/1978 | Miller | 701/124 |
| 4,152,938 | A | * | 5/1979 | Danninger | 374/138 |
| 4,403,872 | A | * | 9/1983 | DeLeo | 374/138 |
| 4,448,019 | A | * | 5/1984 | Klees | 60/204 |
| 4,449,683 | A | * | 5/1984 | Gratzer et al. | 244/130 |
| 4,549,706 | A | * | 10/1985 | Stickney | 244/1 R |
| 4,686,884 | A | * | 8/1987 | Piesik | 89/1.816 |
| 4,764,872 | A | * | 8/1988 | Miller | 701/3 |
| 4,821,566 | A | * | 4/1989 | Johnston et al. | 73/178 R |
| 4,833,911 | A | * | 5/1989 | Zeeban et al. | 73/117.4 |
| 5,001,638 | A | * | 3/1991 | Zimmerman et al. | 701/14 |
| 5,025,661 | A | | 6/1991 | McCormack | |
| 5,043,558 | A | * | 8/1991 | Byles | 219/201 |
| 5,575,440 | A | * | 11/1996 | LeBlond et al. | 244/134 F |
| 5,628,565 | A | * | 5/1997 | Hagen et al. | 374/143 |
| 5,653,538 | A | * | 8/1997 | Phillips | 374/138 |
| 6,370,450 | B1 | * | 4/2002 | Kromer et al. | 701/14 |

(Continued)

FOREIGN PATENT DOCUMENTS

FR        0103605        11/2001

(Continued)

*Primary Examiner*—Gail Verbitsky
(74) *Attorney, Agent, or Firm*—Lowe Hauptman & Berner LLP

(57) ABSTRACT

The invention relates to a device for determining total temperature for aircraft. This device is particularly useful in a probe, called a multifunction probe, for measuring several aerodynamic parameters such as, for example, the total pressure (Pt), the static pressure (Ps) and the total temperature (TT) of an airflow surrounding the aircraft. The device includes a deiced temperature probe. To obtain the total temperature ($TT_{corrected}$) of the airflow, the temperature ($TT_{measured}$) recorded by the temperature probe is corrected as a function of the upstream infinity parameters ($M_\infty$, $Pt_\infty$, $Ps_\infty$) of the aircraft and of the power (P) dissipated in the probe in order to deice it.

8 Claims, 1 Drawing Sheet

U.S. PATENT DOCUMENTS

| | | | |
|---|---|---|---|
| 6,449,573 B1* | 9/2002 | Amos | 702/98 |
| 6,490,510 B1* | 12/2002 | Choisnet | 701/14 |
| 6,543,298 B1* | 4/2003 | Cronin et al. | 73/861.65 |
| 6,609,825 B1* | 8/2003 | Ice et al. | 374/138 |
| 6,622,556 B1* | 9/2003 | May | 73/202.5 |
| 6,679,112 B1* | 1/2004 | Collot et al. | 73/170.04 |
| 6,840,672 B1* | 1/2005 | Ice et al. | 374/139 |
| 7,014,359 B1* | 3/2006 | Suga | 374/208 |
| 7,033,071 B1* | 4/2006 | Otsuka | 374/142 |
| 7,036,365 B1* | 5/2006 | Choisnet | 73/170.02 |
| 7,051,586 B1* | 5/2006 | Choisnet et al. | 73/147 |
| 2002/0131474 A1* | 9/2002 | Suga | 374/138 |
| 2003/0051546 A1* | 3/2003 | Collot et al. | 73/170.02 |
| 2004/0011124 A1* | 1/2004 | Choisnet et al. | 73/170.02 |
| 2004/0095984 A1* | 5/2004 | Severson | 374/16 |
| 2005/0103927 A1* | 5/2005 | Barre et al. | 244/10 |
| 2005/0174073 A1* | 8/2005 | Garnaud et al. | 318/42 |
| 2005/0190816 A1* | 9/2005 | Simeon | 374/141 |
| 2005/0252288 A1* | 11/2005 | Giterman | 73/170.02 |

FOREIGN PATENT DOCUMENTS

| | | |
|---|---|---|
| WO | WO 01/88496 | 11/2001 |
| WO | WO 03/050496 | 6/2003 |

* cited by examiner

DEVICE AND METHOD FOR DETERMINING TOTAL TEMPERATURE FOR AIRCRAFT

RELATED APPLICATION

The present application is based on, and claims priority from, French Application No. 03 10869, filed Sep. 16, 2003, the disclosure of which is hereby incorporated by reference herein in its entirety.

The invention relates to a device and to a method for determining total temperature for aircraft. This method and this device are particularly useful in a probe, called a multifunction probe, for measuring several aerodynamic parameters such as, for example, the total pressure Pt, the static pressure Ps and the total temperature TT of an airflow surrounding the aircraft.

BACKGROUND OF THE INVENTION

French Patent Application FR 2 802 647, filed on 17 Dec. 1999 in the name of Thomson-CSF, discloses such a probe comprising a pitot tube for measuring the total pressure Pt of the airflow and means for measuring the total temperature TT in the form of a channel, the air entry orifice of which substantially faces the flow and of a chamber that includes a temperature sensor. The chamber takes off part of the air flowing in the channel.

The measurement of these two parameters—total temperature and total pressure—is used in determining the actual velocity of the aircraft. Advantageously, the multifunction probe furthermore includes means for measuring the static pressure Ps and the angle of incidence α of the airflow surrounding the aircraft. All the parameters needed to determine the modulus and the direction of the velocity vector of the aircraft are therefore available.

Measurement of the total temperature assumes theoretically that the streams of air for which the temperature is measured have a zero velocity. However, a certain amount of ventilation must be provided around the temperature sensor so as to prevent the latter from measuring the temperature of the probe structure. This ventilation also allows a sufficiently short response time to be achieved. The ventilation is generally provided by the speed of the aircraft, which drags air into the channel and into the chamber where the temperature measurement is carried out. On board an aircraft, the probe must operate within a wide velocity range, which results in substantial velocity variations in the chamber. Consequently, the measurement carried out by the temperature sensor is subject to an error, called the "recovery error", which essentially depends on the velocity of the aircraft. At low velocity, the recovery error is low, but the response time is long. At high velocity, the temperature sensor is well ventilated and the response time is therefore shorter, but the recovery error is large.

Moreover, probes mounted on an aircraft are subjected to substantial temperature variations and, sometimes, to conditions under which ice may develop, especially inside the pitot tube or inside the channels for measuring the total temperature TT. The ice disturbs the measurements and, to prevent this, the probe includes means for heating it. These means generally comprise a wire that heats the probe by Joule heating. This wire is coiled in the walls of the probe. The power dissipated by the wire is of the order of several hundred watts. This power disturbs the measurement carried out by the temperature sensor, by heating the probe structure, and introduces an error called the "deicing error", which is greater the higher the injected power.

Attempts have been made to correct this error by placing a heat shield around the temperature sensor and by optimizing the shapes of the entry channel and of the chamber so as to improve the airflow around the temperature sensor. For example, efforts have been made to remove from the probe, air forming part of a thermal boundary layer that develops along the wall of the channel and of the temperature measurement chamber. This boundary layer is particularly disturbed by the heating of the probe. Despite such precautions, it is barely possible to obtain a correct measurement of the total temperature for low aircraft velocities, especially for aircraft velocities below Mach 0.3. The thickness of this boundary layer is greater the lower the aircraft velocity. However, the measurement accuracy at such low velocities is of considerable importance for the safety of the flight as it makes it possible to determine the parameters of the airflow surrounding the aircraft, right from the taxing phase of the aircraft and before it takes off. To alleviate this problem, a forced circulation of air is produced in the measurement chamber by means of a venturi effect produced on the air stream escaping from the chamber. This solution is expensive as it requires considerable mechanical modifications. In addition, aircraft manufacturers insist on being able to carry out, especially on the new-generation large-capacity aircraft, total temperature measurements under increasingly severe icing conditions, thereby requiring greater deicing power levels and thereby further increasing the deicing error.

SUMMARY OF THE INVENTION

The invention aims to alleviate these problems by making it possible to determine the total temperature of the airflow surrounding an aircraft by means of a deiced probe even at low aircraft velocities and without forced ventilation of the probe.

For this purpose, the subject of the invention is a device for measuring the total temperature of an aircraft, comprising a probe fixed to a skin of the aircraft, the probe comprising means for measuring a total temperature and means for dissipating thermal power intended to prevent ice from forming in the probe, characterized in that the device further includes means for correcting a temperature recorded by the means for measuring a total temperature as a function of the velocity of the aircraft and of the power dissipated in the probe, in order to obtain the total temperature of the airflow.

The subject of the invention is also a method for determining the total temperature of an aircraft using a probe fixed to a skin of the aircraft, the probe comprising means for measuring a total temperature and means for dissipating thermal power intended to prevent ice from forming in the probe, characterized in that it consists in correcting a temperature recorded by the means for measuring a total temperature as a function of the velocity of the aircraft and of the power dissipated in the probe, in order to obtain the total temperature of the airflow.

The probe disclosed in French Patent Application FR 2 802 647 includes a moving blade that can be oriented along the axis of the airflow that surrounds it. This probe includes means for measuring total temperature and a pitot tube for measuring the total pressure of the airflow surrounding the aircraft. The temperature measurement may be disturbed by the inflow of the air entering the temperature measurement means. In French Patent Application FR 2 802 647, the temperature measurement means are fixed to the moving blade and the temperature measurement is therefore not disturbed by the inflow. However, it is obvious that the invention can be implemented both for a probe that has a moving blade and for a probe that does not. This type of probe is known as a fixed probe and the pressure taps, the pitot tube and the total temperature measurement means are in a fixed position relative to the skin of the aircraft. The invention is also suitable for an isolated total temperature probe that has no pressure tap. In order to correct the temperature measured by the temperature probe, measurements carried out by pressure measurement probes placed elsewhere on the skin of the aircraft are then used.

BRIEF DESCRIPTION OF THE DRAWING

The invention will be more clearly understood and other advantages will become apparent on reading the detailed description of one embodiment given by way of example, the description being illustrated by the appended drawing in which.

DETAILED DESCRIPTION OF THE PREFERRED EMBODIMENT

Figure 1:
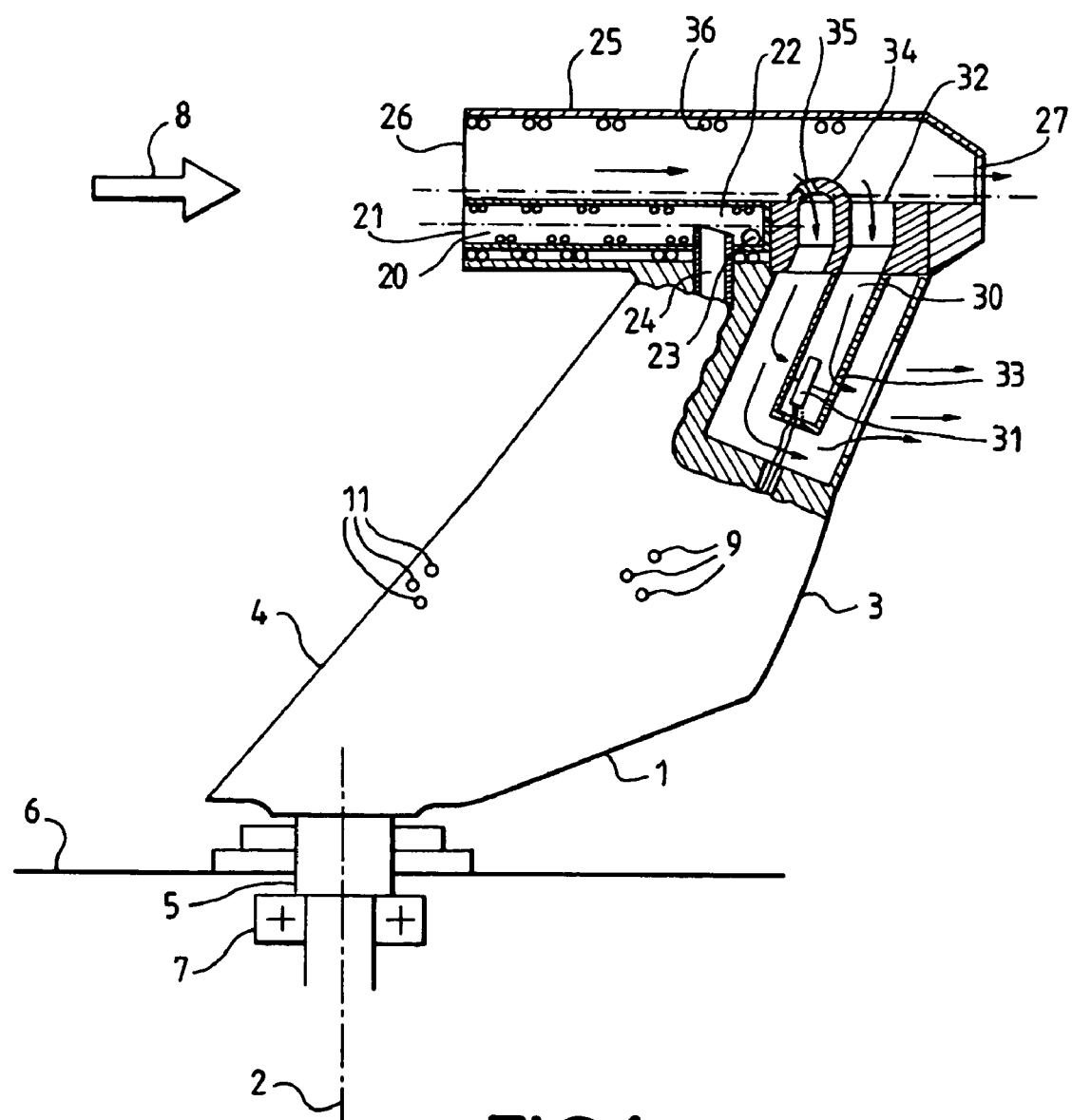
FIG. 1 shows a probe comprising means for measuring the total temperature of the airflow, means for measuring the total pressure of the airflow, means for measuring the static pressure of the airflow and means for measuring the angle of incidence of the airflow surrounding the aircraft, the plane of the figure containing the axis of the flow.

The probe shown in FIG. 1 includes a moving blade 1 that can rotate about an axis 2. The blade 1 has an aerofoil 3 possessing a plane of symmetry parallel to the plane of the figure and separating the pressure surface from the suction surface. The profile of the aerofoil 3 perpendicular to its leading edge 4 is, for example, of the OOZT type of the NACA. In the example shown, the leading edge 4 is substantially rectilinear and inclined to the axis 2. Of course, other aerofoil shapes may be used to implement the invention. The blade 1 also includes a shaft 5 of axis 2, which penetrates into the skin 6 of an aircraft. The shaft 5 can rotate relative to the aircraft, for example by means of a rolling bearing 7.

Owing to the shape of the aerofoil 3, the blade 1 naturally orients along the axis of the airflow surrounding the moving blade 1. The axis of the flow is portrayed by the arrow 8 shown in FIG. 1.

Advantageously, the probe includes means for measuring the static pressure Ps and the angle of incidence α of the airflow. The means for measuring the static pressure Ps comprise, for example, two static pressure taps 9 and 10, each located on one of the faces of the moving blade 1. In FIG. 1, only the pressure tap 9 is visible. The pressure tap 10 is placed on the unseen face of the moving blade 1, so as to be approximately symmetrical with the pressure tap 9 relative to the plane of symmetry of the aerofoil 3. This plane of symmetry is parallel to the plane of FIG. 1. Each pressure tap 9 and 10 may comprise several orifices, three being shown in FIG. 1, so as in particular to limit the cross section of each orifice, in order for there to be less disturbance of the airflow surrounding the moving blade 1, or else so as to allow the pressure measurement to be carried out even if one of the orifices should be obstructed. The two static pressure taps 9 and 10 are in communication with a chamber located inside the blade so as to average out the pressure between the two taps 9 and 10. The pressure of the air present in this chamber is measured in order to obtain the static pressure Ps of the airflow.

The means for measuring the angle of incidence of the flow comprise, for example, two incidence pressure taps 11 and 12 located, as in the case of the static pressure taps 9 and 10, each on one of the faces of the blade, also substantially symmetrically in relation to the plane of symmetry of the aerofoil 3. The incidence pressure taps 11 and 12 are not in communication and it is the difference between the pressures present in each tap 11 and 12 that makes it possible to determine the precise angle of incidence of the moving blade 1 and consequently that of the aircraft. To improve the sensitivity of the angle of incidence measurement, the pressure taps 11 and 12 may be placed in the immediate vicinity of the leading edge 4 of the moving blade 1. The use of the information coming from the various total pressure, static pressure and incidence taps is for example described in French Patent FR 2 665 539 filed on 3 Aug. 1990 in the name of Sextant Avionique.

That patent described in particular the slaving of the angular position of the moving blade 1 about its axis 2 so that the aerofoil 3 of the moving blade 1 is optimally aligned along the axis 8 of the airflow.

The orientation, thus improved, of the moving blade 1 makes it possible in particular to improve the alignment of the means for measuring the total pressure Pt and total temperature TT with the axis 8 of the airflow.

The means for measuring the total pressure are located in that part of the probe furthest away from the skin 6 of the aircraft. The means for measuring the total pressure comprise, for example, a tube 20, advantageously of circular cross section, called a pitot tube, oriented approximately along the axis 8 of the airflow. More precisely, the tube 20 has an air inlet orifice 21 substantially facing the airflow of axis 8. At the end 22 of the tube, i.e. the end 22 opposite the orifice 21, the tube 20 has a purge hole 23 for discharging particles liable to enter the tube 20. Also at the end 22 of the tube, a channel 24 opens into the tube 20. The channel 24 is, for example, connected to a pressure sensor (not shown in the figure). The pressure sensor allows the total pressure Pt of the airflow to be effectively measured.

The means for measuring the total temperature TT comprise, for example, a channel 25, advantageously of circular cross section, and open to the flow of air at an inlet orifice 26. The channel 25 also includes an outlet orifice 27 allowing the air in the channel 25 to escape along the direction of the axis 8. The cross section of the inlet orifice 26 is substantially that of the channel 25 and the cross section of the outlet orifice 27 is smaller than that of the inlet orifice 26. The outlet orifice 27 allows particles travelling along the channel 25 to be discharged without coming into contact with a temperature sensor whose position will be described later. These particles are, for example, formed from water droplets or dust.

The means for measuring the total temperature TT furthermore include a chamber 30 through which part of the air flowing along the channel 25 flows, and also a temperature sensor 31 fixed in the chamber 30. The chamber 30 has an air inlet 32 located in the channel 25. Part of the air flowing along the channel 25 enters the chamber 30 via the air inlet 32 and escapes from the chamber 30 via an air outlet 33 that opens onto the outside, downstream of the probe. The geometry of the channel 25, of the air inlet 32 and of the chamber 30 is determined in such a way as to slow down the airflow passing into the chamber 30.

Before passing into the chamber 30, the air flowing in the channel 25 passes over a deflector 34 having an orifice 35 for discharging, to the outside of the probe, air forming part of a boundary layer that develops along the wall of the pitot tube 20 inside the channel 25.

The probe includes deicing means for heating the probe. These means are necessary, especially when the aircraft carrying the probe is flying under conditions in which there is a risk of ice forming on the walls of the probe. The deicing means comprise, for example, a heating wire 36 wound in a helix on the inside of the tube 20 and of the channel 25. The heating wire 36 is subjected to an electrical voltage and it heats the probe by Joule heating.

According to the invention, the device includes means for correcting a temperature recorded by the temperature probe as a function of the upstream infinity parameters of the aircraft and of the power dissipated in the probe for deicing, in order to obtain the total temperature of the airflow. These means are, for example, installed on an electronic card placed inside the probe or else in a computer within the aircraft and allowing the flight parameters of the aircraft to be determined.

These means were calibrated after wind tunnel tests, and these tests were used to generate a model for correcting the recovery and deicing errors. In this model, the two errors—recovery error and deicing error—are corrected independently. A corrected total temperature $TT_{corrected}$ may be expressed in the following manner:

$$TT_{corrected} = TT_{measured} - \text{Correction}_{recovery} - \text{Correction}_{deicing}$$

where $TT_{measured}$ represents the temperature measured by the temperature sensor;

where $\text{Correction}_{recovery}$ represents the correction applied in order to take account of the recovery error; and where $\text{Correction}_{deicing}$ represents the correction applied in order to take account of the deicing error.

The recovery error is corrected using a linear function of the aircraft velocity expressed as the Mach number. This function is expressed in the following manner:

$$\text{Correction}_{recovery} = f \times M_\infty + g,$$

where f and g are constants determined from experimental results obtained on the probe in question subjected to various airflow velocities in a wind tunnel; and where $M_\infty$ represents the Mach number of the flow at upstream infinity.

The deicing error is corrected using a function of the aircraft velocity expressed as the Mach number, of the power P dissipated in the probe in order to deice it and of an upstream infinity total pressure $Pt_\infty$. This function is expressed in the following manner:

$$\text{Correction}_{deicing} = (aP^2 + bP)(cM_\infty^2 + dM_\infty + e)\left[\frac{101325}{Pt_\infty}(1 + 0.2M_\infty^2)^{2.5}\right]^{0.2}$$

where a and b are polynomials that are functions of Z and of $M_\infty$, Z being the reduced Mach number; and where c, d and e are constants determined from experimental results obtained on the probe in question in a wind tunnel.

The polynomials a and b are expressed, for example, in the form:

$$a = k \times (l - M_\infty) \text{ if } M_\infty < 0.7 \text{ and } a = k_0 \text{ if } M_\infty > 0.7$$

$$b = m \times Z^{-\delta} \times (1 + n \times M_\infty^2)^{-\delta}$$

where $k_0$, k, l, m and n are constants and where $\delta$ is a function of the altitude of the aircraft.

When a probe includes, in addition to the temperature sensor, means for measuring the static pressure Ps and means for measuring the total pressure Pt of the flow surrounding the probe, the latter becomes autonomous. More precisely, it is possible, with the parameters that the probe measures, to correct the value measured by the temperature probe so as to obtain a reliable value of the total temperature of the flow.

In practice, the pressures Ps and Pt measured by the probe are local static and total pressures around the probe. The pressures Ps and Pt are used to calculate a local Mach number $M_{loc}$ in the following manner:

$$M_{loc} = \sqrt{5\left[\left(\frac{Pt}{Ps}\right)^{2/7} - 1\right]}$$

The upstream infinity Mach number $M_\infty$ of the flow is determined empirically from the local Mach number $M_{loc}$, for example using a polynomial formula. This formula may be expressed in the following manner:

$$M_\infty = p \times M_{loc}^6 - q \times M_{loc}^5 + r \times M_{loc}^4 - s \times M_{loc}^3 + t \times M_{loc}^2 - u \times M_{loc} + v$$

where p, q, r, s, t, u and v are constants determined from wind tunnel tests.

Likewise, the upstream infinity total pressure $Pt_\infty$ may be determined empirically from the local Mach number $M_{loc}$ and from the measured total pressure Pt:

$$Pt_\infty = -\alpha \times Pt \times M_{loc}^2 + \beta \times Pt \times M_{loc} + \chi \times Pt + \epsilon$$

where $\alpha$, $\beta$, $\chi$ and $\epsilon$ are constants determined from tunnel tests.

The upstream infinity static pressure $Ps_\infty$ may be determined from the formula:

$$Ps_\infty = Pt_\infty \times (1 + 0.2 \times M_\infty^2)^{-3.5}.$$

Advantageously, the correction applied to the total temperature measurement $TT_{measured}$ may be improved by taking into account the mean temperature of the probe that disturbs the measurement through the radiation from the probe structure.

In practice, to determine the mean temperature of the probe, a heating wire 36 whose resistance varies as a function of its temperature may be used. It is therefore possible to deduce the mean temperature of the probe by measuring the resistance of the heating wire 36.

The invention claimed is:

1. A device for determining a total corrected temperature ($TT_{corrected}$) of an aircraft, including a probe fixed to a skin of the aircraft, the probe comprising:

means for measuring a total temperature ($TT_{measured}$); and means for dissipating thermal power intended to prevent ice from forming in the probe;

means for correcting said measured total temperature ($TT_{measured}$) recorded by the means for measuring a total temperature as a function of upstream infinity parameters ($M_\infty$, $Pt_\infty$, $Ps_\infty$) and of the power (P) dissipated in the probe, in order to obtain the total corrected temperature ($TT_{corrected}$) of the airflow, wherein, $M_\infty$ is a Mach number of the flow at upstream infinity, $Pt_\infty$ is a dynamic pressure at upstream infinity, $Ps_\infty$ is a static pressure at upstream infinity.

2. The device according to claim 1, wherein the means for measuring a total temperature comprise a chamber into which part of an airflow surrounding the skin of the aircraft penetrates, means for slowing down the airflow penetrating into the chamber, and a temperature sensor placed in the chamber and intended to measure the temperature of the slowed-down airflow.

3. The device according to claim 1, wherein the device includes means for measuring the static pressure (PS) of the airflow.

4. The device according to claim 1, wherein the device further includes means for measuring the total pressure (Pt) of the airflow.

5. A method for determining the total corrected temperature ($TT_{corrected}$) of an aircraft using a probe fixed to a skin of the aircraft, the probe comprising means for measuring a total temperature ($TT_{measured}$) and means for dissipating thermal power intended to prevent ice from forming in the probe, the method comprising the steps of:

correcting said measured temperature ($TT_{measured}$) recorded by the means for measuring a total corrected temperature as a function of the upstream infinity parameters of the aircraft and of the power (P) dissipated in the probe, in order to obtain the total temperature ($TT_{corrected}$) of the airflow, wherein $M_\infty$ is a Mach number of the flow at upstream infinity, $Pt_\infty$ is a dynamic pressure at upstream infinity, $Ps_\infty$ is a static pressure at upstream infinity.

6. A method according to claim 5, comprising correcting a recovery error due to the velocity of the aircraft using a linear function of the velocity ($M_\infty$, $M_{loc}$) of the aircraft, this function being expressed in the following manner:

$$Correction_{recovery} = f \times M_\infty + g,$$

where $Correction_{recovery}$ is a correction applied to a temperature ($TT_{measured}$) measured by means for measuring a total temperature and representative of the recovery error, and where f and g are constants determined from experimental results obtained on the probe in question subjected to various airflow velocities in a wind tunnel.

7. A method according to claim 5, comprising correcting a deicing error due to the means for dissipating thermal power using a function of the velocity ($M_\infty$, $M_{loc}$) of the aircraft expressed as the Mach number and of the power dissipated in the probe for deicing, this function being expressed in the following manner:

$$Correction_{deicing} = (aP^2 + bP)(cM_\infty^2 + dM_\infty + e)\left[\frac{101325}{Pt_\infty}(1+0.2M_\infty^2)^{2.5}\right]^{0.2}$$

where $Correction_{deicing}$ is a correction applied to a temperature measured by a temperature sensor and representative of the icing error, where a and b are polynomials that are functions of Z and of $M_\infty$, Z being a reduced Mach number; and where c, d and e are constants determined from experimental results obtained on the probe relative to a wind tunnel, the polynomials a and b being expressed, for example, in the form:

$$a = k \times (l - M_\infty),$$

$$b = m \times Z^{-\delta} \times (l + n \times M_\infty^2)^{-\delta}$$

where k, l, m and n are constants and where $\delta$ is a function of the altitude of the aircraft.

8. A method according to claim 5, wherein it consists in comprising correcting the temperature ($TT_{measured}$) recorded by the means for measuring a total temperature ($TT_{measured}$) as a function of a mean temperature of the probe.

* * * * *